Aug. 30, 1966   B. L. BRUCKEN ETAL   3,269,544
DOMESTIC APPLIANCE

Filed Aug. 30, 1963   3 Sheets-Sheet 1

INVENTORS
Byron L. Brucken
BY James W. Light

J.C. Evans
Their Attorney

INVENTORS
Byron L. Brucken
BY James W. Light
J.C. Evans
Their Attorney

Aug. 30, 1966   B. L. BRUCKEN ETAL   3,269,544
DOMESTIC APPLIANCE

Filed Aug. 30, 1963   3 Sheets-Sheet 3

INVENTORS
Byron L. Brucken
BY James W. Light
J.C. Evans
Their Attorney

United States Patent Office 3,269,544
Patented August 30, 1966

3,269,544
DOMESTIC APPLIANCE
Byron L. Brucken, Dayton, and James W. Light, Greenville, Ohio, assignors to General Motors Corporation, Detroit, Mich., a corporation of Delaware
Filed Aug. 30, 1963, Ser. No. 305,641
10 Claims. (Cl. 210—364)

This invention relates to domestic appliances and more particularly to means for supporting a rotatable mass and items operatively associated therewith in a spin tub type clothes washer or the like.

One problem in centrifugal machines such as spin tub type clothes washers or the like has been how to minimize the transmissibility of disturbing forces or unbalanced loads that act on the rotatable mass to the supporting framework portion of the machine. Such transmitted forces, depending upon their magnitude, produce disturbances in the supporting framework ranging from high frequency vibrations to substantial mass movements of varying amplitude.

An object of the present invention is to substantially eliminate such disturbances in the supporting framework for a rotatable mass.

A further object of the present invention is to substantially eliminate the transmissibility of disturbing forces acting on a rotatable mass to a supporting framework associated therewith by guidingly supporting the weight of the rotational mass without materially altering the natural vibrational displacements thereof.

A further object of the present invention is to provide an improved supporting arrangement for a centrifugal mass subjected to variable disturbing forces that produce natural vibrational patterns characterized by a shifting nodal point including means for guidingly supporting the weight of the centrifugal mass without materially altering the natural vibrational characteristics thereof during periods when the shifting nodal point is located on either side of or in the plane of the center of gravity of the centrifugal mass.

A further object of the present invention is to provide an improved support arrangement for association with a domestic appliance having a spin tub or the like wherein means are provided to guidingly support the rotating spin tub without altering the natural vibrational characteristics thereof to minimize the transmissibility of disturbing forces to an outer casing of the appliance.

A still further object of the invention is to improve support arrangements for a rotatable mass by the provision therein of means for producing a substantial damping of displacements of the mass at its critical speed and little damping of displacements of the mass above its critical speed.

Further objects and advantages of the present invention will be apparent from the following description, reference being had to the accompanying drawings wherein preferred embodiments of the present invention are clearly shown.

Figure 1:
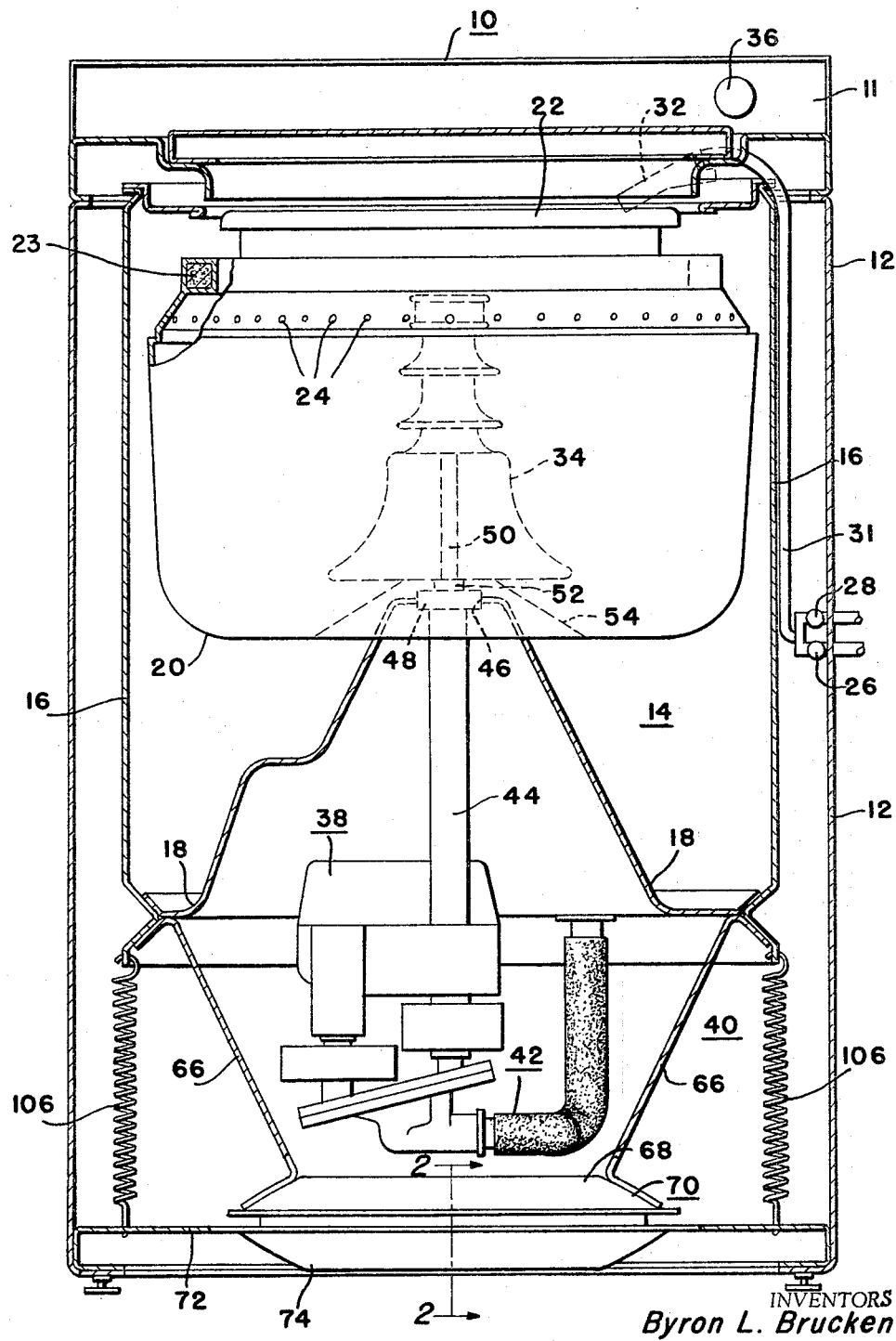
FIGURE 1 is a schematic, sectional view partly in elevation of a clothes washer including the supporting arrangement of the present invention.

Referring now to the drawings in FIGURE 1 the invention is representatively illustrated as being associated with a clothes washer 10 including a control housing portion 11 and a casing 12 enclosing a water container chamber 14 formed by a cylindrical wall 16 having an open upper end and a lower end closed by a bulkhead 18. Within the cylindrical water container wall 16 is a spin tub 20 having a top opening 22 therein surrounded by a ballast ring 23. A plurality of centrifuging ports 24 formed in side wall of tub 20 are designed to permit the egress of water from the tub 20 when the tub is rotated at high speed. For filling the tub 20 with water, a conventional water supply system is provided including a hot water solenoid actuated valve 26 and a cold water solenoid operated valve 28 which are manifolded into a mixed water supply conduit 31 which terminates at a chute 32 overlying the top opening 22 of the tub 20. Within the tub 20 an agitator or pulsator 34 is adapted to reciprocate to circulate or agitate the water admitted through the water supply conduit 31. Thus, clothing placed within the tub 20 is washed as the agitating action of the pulsator 34 causes surging currents of washing fluid and any included washing agent to pass through the clothing fabric. Conventional sequentially operated timer means shown generally at 36 on the control housing 11 may be included to selectively admit water through the supply conduit 31, to spin the tub 20 and to vertically reciprocate the agitator or pulsator 34.

The agitator element 34 and spin tub 20 are operatively associated with an agitating and spin mechanism 38 shown located below the bottom bulkhead 18 of the imperforate water container within a machinery compartment 40 formed by casing 12. Within the compartment 40 a drain pump assembly 42 is operatively associated with mechanism 38 to drain washing fluid from chamber 14 following a wash and spin cycle of operation.

The agitating and spin mechanism 38 includes a stationary shaft enclosing housing 44 directed upwardly through an opening 46 in the bulkhead 18 where a ring element 48 secured to housing 44 is connected to bulkhead 18 for supporting mechanism 38 thereon and sealing against leakage along the outer periphery of housing 44. Extending upwardly from the stationary shaft enclosing housing 44 is an agitator pulsate shaft 50 to which the agitator 34 is connected and a spin shaft 52 which is connected by suitable means to the bottom wall 54 of the spin tub 20. Further details of the agitate and spin mechanism 38 and the operation thereof are set forth in the U.S. patent to Brucken 3,087,321, issued April 30, 1963, with it being understood that the above-described arrangement between the spin tub 20, water container 16 and agitate and spin mechanism 38 is merely representative of a typical washing machine having a rotatably driven spin tub that may become unbalanced during the rotation thereof and thus gyrate and oscillate in a manner that will produce substantial disturbances in the casing 12.

By virtue of the fact that the agitating and spinning mechanism 38 is rigidly fixed to the bulkhead 18 of water container 16 by ring 48, any vibrational motion of the spin tub 20 during the spinning thereof will be transmitted therefrom through the spin shaft 52, the stationary shaft enclosing housing portion 44, and the ring 48 to the cylindrical water container wall 16 which serves as a movable platform for the operative parts of the machine. More particularly, in machines of the above-illustrated type any unbalanced loading of clothes in the spin tub 20 can produce a resultant centrifugal force acting thereon that is offset by a predetermined distance from the center of gravity of the suspended mass represented by the spin tub 20, the water container 16, the agitating and spin mechanism 38 and drain system 42. Such forces induce superimposed vibrational modes in the moving mass that will cause a fixed supporting framework for the moving mass, such as casing 12, to vibrate in a severe manner depending on the degree of transmissibility of disturbing forces thereto. One of these modes is a lateral vibration, i.e., displacement of the tub 20 and the components connected thereto perpendicular to the axis of the rotation of the tub 20. The other of these modes is an angular vibration constituting movement of the tub 20 and the components connected thereto angularly about the axis of rotation thereof.

Figure 5:
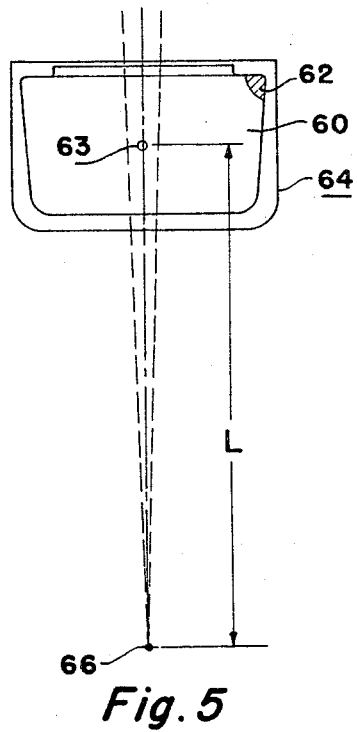
FIGURE 5 is a diagrammatic view showing first vibrational characteristics of a typical centrifugal mass to be supported by the present invention.
Figure 6:
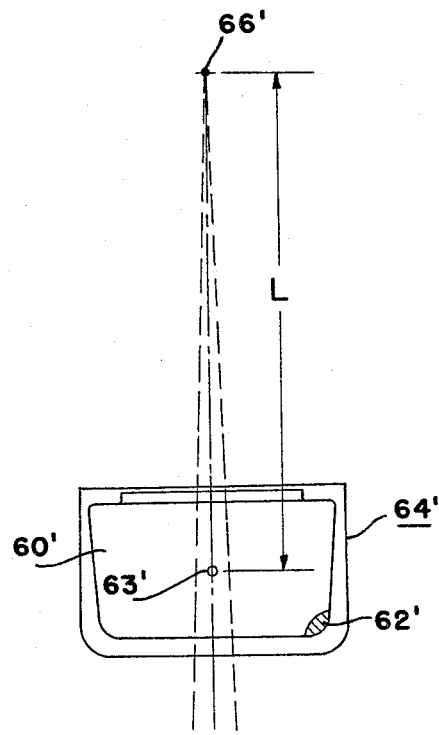
FIGURE 6 is a diagrammatic view like FIGURE 5 showing second vibrational characteristics of the centrifugal mass.

While the above vibrational characteristics of a rotating mass are well known to those skilled in the art, in order to understand certain features of the present invention, reference is made to FIGURE 5 wherein a rotating mass 60 is illustrated subjected to a predetermined unbalanced load 62 offset above the center of gravity 63 of a vibrating system 64 including mass 60. Ideally, if the system 64 is suspended freely in space, it has a predetermined natural vibration characterized by a deflection in the plane of the paper illustrated by the dotted lines on either side of the center line of the system 64 about a nodal point 66 displaced from the center of gravity of the system by a nodal distance L. In some cases, as illustrated in FIGURE 6, the unbalanced loading acting on the rotating mass may shift below the center of gravity of the vibrating system to cause the system to deflect about a nodal point located on the opposite side of the center of gravity from that illustrated in FIGURE 5. In FIGURE 6, elements like those in FIGURE 5 are designated by like numerals primed. Between the limits illustrated in FIGURES 5 and 6 the unbalanced force may be located in the plane of the center of gravity of the system in which case the system will not deflect about a nodal point but will instead shift laterally of the center line of the system.

Figure 2:
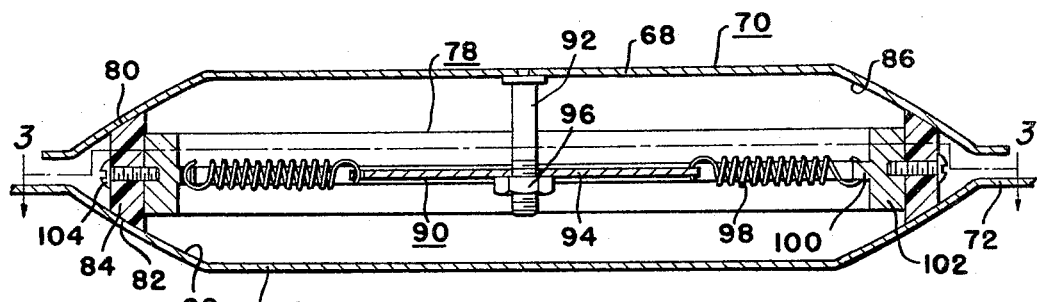
FIGURE 2 is an enlarged view in vertical section taken along the line 2—2 of FIGURE 1.
Figure 3:
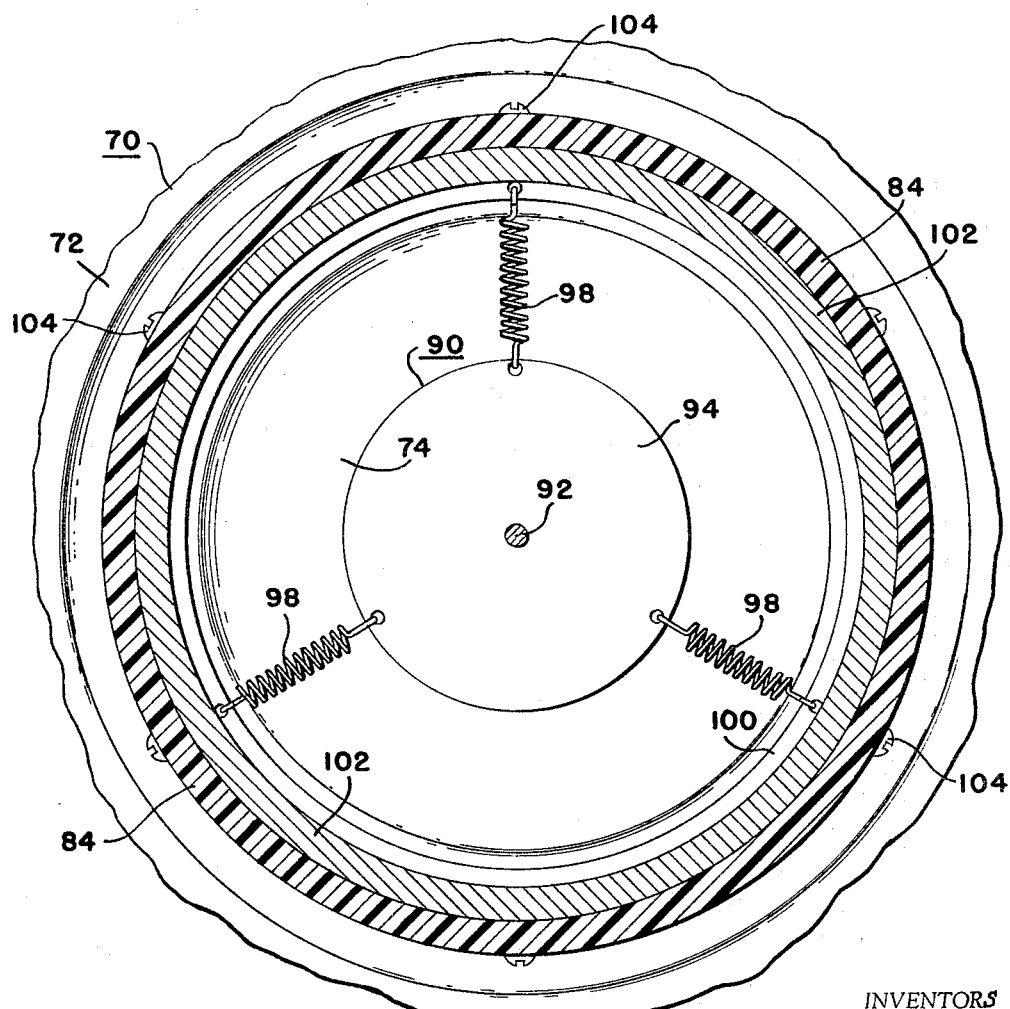
FIGURE 3 is a view in horizontal section taken along the line 3—3 of FIGURE 2.

Returning now to the embodiment of the invention illustrated in FIGURES 1 through 3, the spin tub 20 is equivalent to the centrifugal mass 60 illustrated in the diagrammatic views of FIGURES 5 and 6 since, depending upon the loading of clothes therein, an unbalanced loading can act thereon at a point either above, below or at the center of gravity of the supported system represented by tub 20, container 16, mechanism 38 and drain system 42. Accordingly, the supported system will have natural vibrational patterns characterized by deflection about a shifting nodal point located either above or below the center of gravity of the vibrating system or a lateral shifting movement depending upon where the unbalanced loading occurs in tub 20.

In the illustrated embodiment of the invention a plurality of braces 66 are shown each having one end thereof secured at circumferentially located points on the inner surface of the cylindrical water container wall 16 at a point immediately below the bottom bulkhead 18. Each brace 66 depends from the water container 16 into a lower part of the machinery compartment 40 where its opposite end is fixedly secured to the outer surface of a movable socket element 68 of a suspension assembly 70 constructed in accordance with certain of the principles of the present invention. The suspension assembly 70 further includes a bottom support plate 72 forming the base of the casing 12 and including a fixed socket portion 74 located centrally thereof beneath the movable socket element 68 centered about the vertical axis of the suspended system.

Supported within the fixed and movable sockets 74, 68 is a freely floating shuttle or movable bearing assembly 78 for guidingly supporting the movable socket 68 on the fixed socket 74. The shuttle assembly is best characterized, in the illustrated embodiment, by a double spherical configuration formed by convexly shaped surfaces 80, 82 on the top and bottom of a movable bearing ring 84 of a material having a relatively low sliding coefficient of friction and a relatively high static coefficient of friction, for example, polyethylene. Each surface 80, 82 is representatively shown as being shaped as a portion of a spherical surface with surface 80 facing in an opposite direction to surface 82. The upper surface 80 supportingly engages a concavely shaped annular bearing surface 86 formed interiorly at the outer periphery of the movable socket 68 and the lower surface 82 engages an annular concavely shaped bearing surface 88 at the outer periphery of socket 74 to support the weight of the suspended system on the base of the casing 12. The illustrated shapes of surfaces 80, 82, 86, 88 are merely illustrative of the preferred arrangement for use in association with washing machines of the type described above with it being understood that the shape of surfaces 80, 82 can be concave so long as surfaces 86, 88 are convexly shaped. The invention also contemplates arrangements wherein surfaces 82, 88 are substantially flat.

Movement of socket 68 of the suspension assembly 70 during the operation of the machine is controlled by a spring return system 90 located concentrically of the ring 84 between movable and fixed sockets 68, 74. The spring return system 90, more particularly, comprises a stud 92 having one end thereof fixedly secured to the center of the inner surface of socket 68 depending therefrom through a circular plate 94 located concentrically of the ring 84 at a point intermediate the surfaces 80, 82 thereon where a nut 96 threadably engages the end of the stud 92 on the underside of the plate 94 for limiting the vertical separation between the socket 68 and circular plate 94. The plate 94 is centered within the ring 84 by means of a plurality of circumferentially located radially directed springs 98 each having one of its ends connected to the outer edge of the plate 94 and the opposite end thereof connected to a hook 100 formed on the inner surface of a reinforcing member 102 secured to the inner surface of the ring 84 by suitable fastening means, for example, a plurality of circumferentially located screws 104. By virtue of the above-described arrangement, any tendency for extreme relative movement between movable socket 68 and fixed socket 74 to slide bearing ring 84 outwardly thereof is counteracted.

In the illustrated embodiment of the invention, in order to further stabilize the suspended system on the base of the casing 12, the cylindrical water container wall 16 is connected at the bottom edge thereof to one end of each of a plurality of elongated springs 106 having the opposite ends thereof connected to the bottom support plate 72 of the suspension assembly 70. The springs 106 serve to hold the container 16 and movable socket 68 in a centered position without significantly affecting the vibrational movements thereof.

Upon conditioning the controls of the illustrated washing apparatus to rotate the spin tub following a rinse or during a spin dry cycle, the spin tub 20 will rotate at a high r.p.m. and unbalanced loads therein will cause natural vibrational movements in the suspended system between the limits illustrated in FIGURES 5 and 6. By virtue of the above-described arrangement, the transmissibility of the unbalanced loading on the spin tub 20 to the casing 12 through the bottom support plate 72 will be held to a minimum since the bearing surfaces in the improved suspension system 70 will guidingly support the weight of the supported mass without materially altering the natural vibrational characteristics of the system. More particularly, assuming that the spin tub 20 is spinning in the range of 1000–1100 r.p.m. and being influenced by a disturbing force or unbalanced force of three to four pounds located above the center of gravity of the system wherein the system has a nodal distance L of approximately forty inches, the system will deflect as illustrated in FIGURE 5.

As the spin tub 20 is driven by the mechanism 38 from an at rest position to the high speed spin range of rotation, the suspended system passes through a critical speed that in the illustrated embodiment can occur at a relatively low r.p.m. when the vibrating system has a large nodal distance because of the arrangement of unbalanced loading in tub 20. The vibrations in the system at the critical speed are restrained because of a relatively large static coefficient of friction produced by the polyethylene ring 84 in conjunction with the fixed socket 74 and the movable socket 68. Eventually the disturbing forces will increase because of the increased speeds of rotation of spin tub 20 until the movable socket 68 begins to move relative to the fixed socket 74 against the frictional forces imposed thereon by the ring 84. When this occurs, the damping effect of the ring 84 on the system is materially reduced because the dynamic or sliding coefficient thereof is substantially less than that present under static conditions. Accordingly, assuming that the unbalanced loading is located in the manner illustrated in FIGURE 5, the movable socket 68 will be freely carried by the water container wall 16 laterally and angularly of the fixed socket 74. The shuttle or bearing ring 84 will shift between the movable and fixed sockets 68, 74 into a position where the upper surface 80 thereon will be disposed to guidingly support the movable socket 68 in its natural movements relative to the fixed socket 74. Thus, the movable socket 68 will move to describe a path on the spherical surface 80 on the ring 84 when it is in a particular shifted position resulting from the movement of the socket 68. The free floating action of the shuttle assembly 78 will maintain the surface 80 in a guidingly supporting relationship with the surface 86 on socket 68 though the unbalanced loading in the system might change position to cause the nodal point to shift from the position illustrated in FIGURE 5 in the direction of the center of gravity of the suspended system. Thus, suspension system 70 will transmit the weight of the suspended system to the bottom support plate 72 without materially altering the natural movement of the system. Because of the unrestrained guiding support of the suspended system, there will be no material resultant forces on the fixed socket 74 other than those produced by the weight of the suspended system. Therefore, the transfer of forces produced by unbalanced loading on the spin tub 20 to the casing 12 is minimized.

Likewise, in cases where the unbalanced loading is arranged below the center of gravity of the suspended system, the system will have a natural vibrational movement of the type illustrated in FIGURE 6. In this case, there will be a deflection of the water container 16 in the vicinity of the suspension system 70 along a varying radius of curvature formed convexly away from the center of gravity of the system. In this case, the movable socket 68 will move to describe a path on the spherical surface 82 of ring 84 which shifts between the movable socket 68 and the fixed socket 74 so that the surface 82 will be guidingly supported on the surface 88 on the fixed socket 74 during movement of the socket 68 laterally and angularly of the fixed socket 74 whereby the weight of the suspended mass will be carried by the bottom support plate 72 without restraining the natural vibrational movements in the suspended system during periods when the nodal point of the system is located above the center of gravity of the suspended system a greater or lesser distance depending upon the unbalanced loading.

In the illustrated arrangement, it is conceivable that the unbalanced loading might be located in the plane of the center of gravity of the system. In this case, the system will not deflect about a nodal point as illustrated in FIGURES 5 and 6 but rather will shift laterally of its centered position without tilting angularly about a nodal point. In this case, the movable socket 68 will shift laterally relative to the fixed socket 74 and the ring 84 will shift to continue to guidingly support movable socket 68 on the fixed socket 74 without restraining the natural vibrational movements of the suspended system.

Thus, the suspension system 70 serves to reduce the transmissibility of disturbing forces on a rotating mass to its supporting framework during periods when the forces are located on either side of or in the same plane as the center of gravity of the suspended system.

Figure 4:
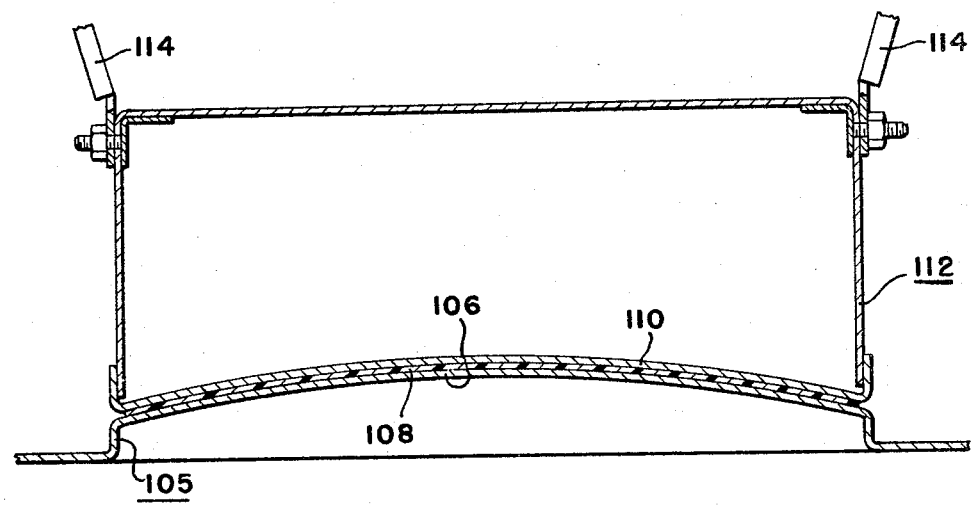
FIGURE 4 is a view in vertical section of another embodiment of the present invention.

Another embodiment of the invention is illustrated in FIGURE 4 for supporting a centrifugal mass having a disturbing force acting thereon of the type illustrated in FIGURE 5 wherein the nodal distance does not vary. This embodiment includes a fixed socket 105 having an upwardly convexly shaped surface 106 thereon coated with a layer of suitable damping material having a static coefficient of friction substantially greater than its sliding or dynamic coefficient of friction, for example, a layer of polyethylene. The surface 106 supportingly engages a curved surface 110 on a movable socket 112 with the surface 110 having a radius of curvature like that of surface 106. The movable socket 112 is adapted to be connected to braces 114 equivalent to braces 66 in FIGURE 1. In this arrangement, the lateral and angular movements of socket 112 with respect to the fixed socket 105 are initially restrained when the system supported thereon is passing through its critical speed, because of the frictional engagement of the layer 108 of damping material with surface 110. Above the critical speed the disturbing forces on the movable socket 112 will be sufficient to overcome the static frictional forces between the fixed and movable sockets and the movable socket 112 will have a movement describing a path on the surface 106 of fixed socket 105 which will serve to guidingly support the movable socket 112 and a system supported thereby without restraining the natural movement thereof. The reduced sliding or dynamic coefficient of friction of the layer 108 will substantially reduce damping of the system once the movable socket 112 begins to shift relative to the fixed socket 105. Accordingly, in this arrangement as was the case in the suspension system of the embodiment of FIGURES 1 through 3, means are provided to guidingly support a vibrating suspended system without restraining the natural vibrational characteristics thereof for minimizing the transmissibility of disturbing forces acting on the system to the fixed support for the system including means for damping the system as it passes through its critical speed without significantly damping the system at speeds above its critical speed.

While the embodiments of the present invention as herein disclosed constitute preferred forms, it is to be understood that other forms might be adopted.

What is claimed is as follows:

1. A system comprising a fixed support, a movable mass including a rotatable component producing a predetermined vibrational movement in said movable mass, means for supporting said movable mass on said fixed support including, a first pair of relatively movable engaging spherical surfaces, a second pair of relatively movable engaging spherical surfaces, both of said pairs of said surfaces being located below the center of gravity of said movable mass, said first pair of engaging surfaces having a predetermined curvature serving to guidingly support the movable mass on the fixed support without restraining vertical and lateral vibrational movement of the mass when the movable mass is subjected to a first predetermined resultant disturbing force, means interconnecting one of said pair of surfaces with respect to the other of said pair of surfaces to allow controlled lateral and vertical relative movement therebetween during rotation of said movable mass, said second pair of engaging surfaces having a predetermined curvature opposite to that of said first pair of engaging surfaces serving to guidingly support the movable mass on said fixed support without restraining its vibrational movement when the movable mass is subjected to a second predetermined resultant disturbing force causing said mass to move about a nodal point shifted to the opposite side of the center of gravity of the movable mass from the nodal point about which the mass moves when subjected to the first predetermined resultant disturbing force.

2. In the system of claim 1, at least one surface of each of said pairs of relatively movable engaging surfaces including friction reducing means for substantially eliminating frictional damping of the vibrational movement of the mass when the disturbing forces thereon are of a predetermined magnitude.

3. In the system of claim 1, at least one surface of each of said pairs of relatively movable engaging surfaces including damping means for producing substantial damping of the relative movement between said engaging surfaces when the disturbing forces on the mass are of a first predetermined magnitude, said damping means being operative to substantially eliminate frictional damping of the relative movement of said surfaces when the disturbing forces on the mass are of a second predetermined magnitude.

4. A system comprising, a fixed support, a rotatable mass having a predetermined vibrational movement, means for supporting said rotatable mass on said fixed support including relatively movable members having spherical surfaces facing in opposite directions, a shuttle located between said spherical surfaces having curved portions thereon forming a bearing surface slidably engaging each of said relatively movable oppositely facing spherical surfaces, and means interconnecting said shuttle to one of said spherical surfaces to allow controlled lateral and vertical relative movement therebetween during rotation of said rotatable mass, said shuttle shifting in response to relative movement of said spherical surfaces to cause said curved bearing surfaces thereon to coact with said spherical surfaces for supporting said mass on said fixed support without restraining the vibrational movement thereof.

5. In the system of claim 4, said interconnecting means including plate means connected to one of said movable members, and spring means connected between said plate means and said shuttle for returning said shuttle to a predetermined position for stabilizing said rotating mass on said fixed support.

6. In the system of claim 4, said interconnecting means including a pin secured centrally of one of said spherical surfaces, and a plurality of springs secured to said pin and said shuttle operable upon relative movement between said spherical surfaces to return said shuttle to a stable position between said spherical surfaces.

7. In the system of claim 4, means including spring elements operatively associated with said fixed support and said rotatable mass for centering said rotatable mass on said fixed support without significantly affecting the vibrational movements thereof.

8. In a clothes washer apparatus the combination of, a fixed support, a rotatable spin tub, drive means for rotating said spin tub to produce a predetermined vibrational movement of said spin tub, support means connected to said rotatable spin tub including a first socket member secured thereto, a second socket member secured to said fixed support, a movable member disposed between said first and second socket members, means for movably connecting said movable member to one of said socket members for lateral and vertical movement with respect thereto, said movable member having a first curved surface engaging said first socket member and a second curved surface engaging said second socket member, said movable member being carried by said one of said socket members and shifted relative to said first and second socket members upon both lateral and vertical movement of said spin tub with respect to said fixed support for supporting said spin tub on said fixed support without restraining relative movement therebetween, said means for movably connecting said movable member to said one of said socket members producing a force on said movable member to center it with respect to said one of said members.

9. In the combination of claim 8, said socket members each having a spherical surface thereon, said spherical surfaces facing opposite to one another, said curved surface on said movable member engaging said second socket being movable vertically on said second socket during movements of said spin tub to produce a restoring force for returning said spin tub to a stable position with respect to said fixed support.

10. In the combination of claim 8, said movable member being a ring having a first continuously formed curved surface on the upper edge thereof and a second continuously formed curved surface on the bottom edge thereof, said means for connecting said movable member to one of said socket members including plate means connected to one of said socket members and spring means connected between said ring and said plate means for biasing said ring to a centered position with respect to said one of said socket members.

References Cited by the Examiner

UNITED STATES PATENTS

| | | | |
|---|---|---|---|
| 1,005,963 | 10/1911 | Groat et al. | 210—364 |
| 1,896,466 | 2/1933 | Schaum | 210—364 |
| 2,797,569 | 7/1957 | Kirby | 68—23 |
| 3,021,997 | 2/1962 | Czech | 210—364 X |
| 3,026,701 | 3/1962 | Houser | 68—23 |

REUBEN FRIEDMAN, *Primary Examiner.*

J. L. DE CESARE, *Assistant Examiner.*